Sept. 14, 1926. 1,599,450
G. B. WILT
FILLING CAN
Filed Feb. 13, 1925
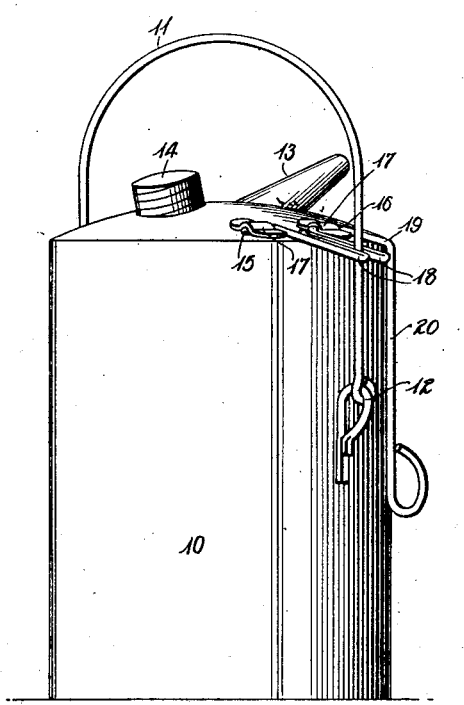
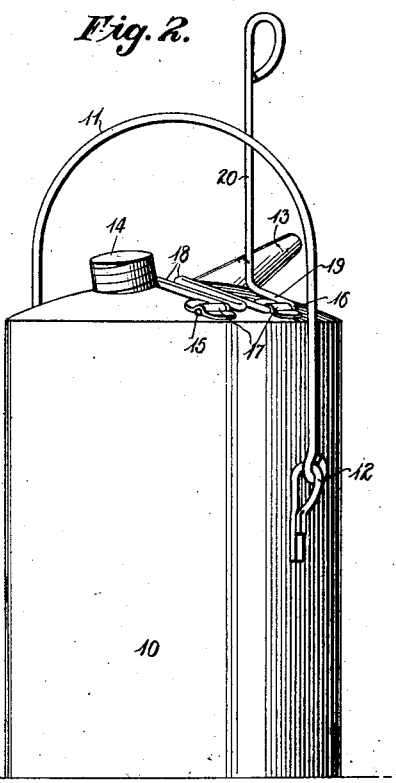
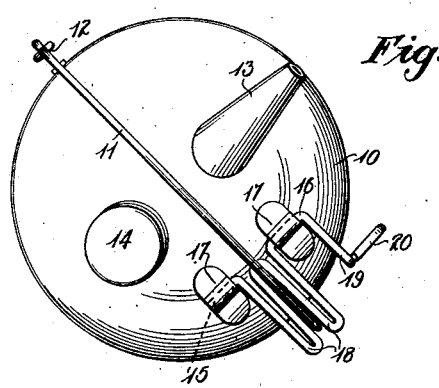
Inventor
G.B.Wilt
By Knight Bros
Attorneys Patented Sept. 14, 1926.

1,599,450

UNITED STATES PATENT OFFICE.

GEORGE B. WILT, OF VINCENNES, INDIANA, ASSIGNOR OF ONE-HALF TO ALBERT J. HEITZ, OF VINCENNES, INDIANA.

FILLING CAN.

Application filed February 13, 1925. Serial No. 9,029.

The present invention relates particularly to the combination with a filling can having a bail, of means for locking the bail in upright position, and an actuator for said locking means, which, in the unlocked position of the latter, serves as means for tipping the container for emptying it.

I have illustrated a form of my invention in the accompanying drawings, in which—

Fig. 1 shows a filling can provided with my bail lock, the latter being in operative position, while Fig. 2 shows the same with the bail lock in unlocked position.

Fig. 3 is a top plan view of the device.

In the drawings, 10 represents a filling can, which may be of any desired form, while 11 represents a bail attached thereto by means of the ears 12. As will be noted, the bail ears are preferably located just above the center of gravity of the can so that the latter will retain its stability when suspended from the bail and yet may be readily tipped relative to the latter for emptying. In the can as shown, a spout 13 is disposed at the upper edge midway between the bail ears and an aperture provided with a cap 14 is located in the upper wall.

My improvement consists in the provision of a locking member, preferably of suitable gauge wire, bent in substantially the form shown and pivotally attached to the can. As will be seen, this member consists of aligned portions 15 and 16 pivotally attached to the can by means of ears 17 disposed at either side of the upright bail, an intermediate portion bent to form the claws 18 adapted to engage the bail at either side thereof (Fig. 1), a rectangular extension 19 on the portion 16 and lying substantially in the plane of the claws 18, and a section 20 depending from the extension 19. The ears 17 are attached to the top wall of the can at a small distance from the edge thereof and the extension 19 is of such length that in the position (locked) shown in Fig. 1 the arm or actuator 20 lies close to the side wall of the can, while in the position shown in Fig. 2 (unlocked) the actuator 20 is supported substantially vertically and well toward the central vertical axis of the can, at least relative to its associated vertical bail section. Thus, when tipping the can relative to the bail by means of the actuator (Fig. 2) a very steady pouring operation is permitted by reason of the pivoting of the receptacle near its center of gravity in conjunction with the added leverage provided by the actuator, and by reason of the substantial elimination of torsional forces due to the disposition of the upright actuator relative to the central vertical axis of the receptacle.

The disposition of the bail ears 12 near the center of gravity of the can develops a tendency in the latter to swing when being carried suspended from the bail. The locking member has, therefore, the additional function of preventing this swinging motion of the can relative to the bail.

I claim:

1. In combination with a receptacle, a bail pivoted thereto, means for locking said bail in upright position, and an actuator arm for said locking means adapted to assume a substantially upright position when said locking means is in unlocking position.

2. In combination with a receptacle, a bail pivoted thereto, means for locking said bail in upright position, an actuator arm for said locking means, said actuator arm extending downwardly adjacent the side of the receptacle when said locking means is in locking position and substantially vertically above the receptacle when said locking means is in unlocking position.

3. In combination with a receptacle, a bail pivoted thereto, means for locking said bail in upright position, an actuator arm for said locking means, said actuator arm extending downwardly adjacent the side of the receptacle when said locking means is in locking position and substantially vertically above the receptacle intermediate the edge and central vertical axis thereof when said locking means is in unlocking position.

4. In combination with a receptacle, a bail pivoted thereto, and means for locking said bail in an upright position, comprising claws pivoted to said receptacle and adapted to engage said bail at either side thereof, and an actuator arm integral with said claws adapted to extend downwardly along the side of said receptacle in the locked position of said bail and substantially vertically above said receptacle in the unlocked position of said bail, 5. In combination with a receptacle, a bail pivoted thereto, and means for locking said bail in upright position, comprising claws pivoted to said receptacle and adapted to engage said bail at either side thereof, an angular extension on the axial portion of said claws, and an actuator on said extension and angularly disposed thereto, as and for the purpose described.

The foregoing specification signed at Vincennes, Indiana, this 9th day of February, 1925.

GEORGE B. WILT.